May 22, 1923. Re. 15,610
H. M. BRAMBERRY.
METALLIC PISTON PACKING
Original Filed Feb. 12, 1920
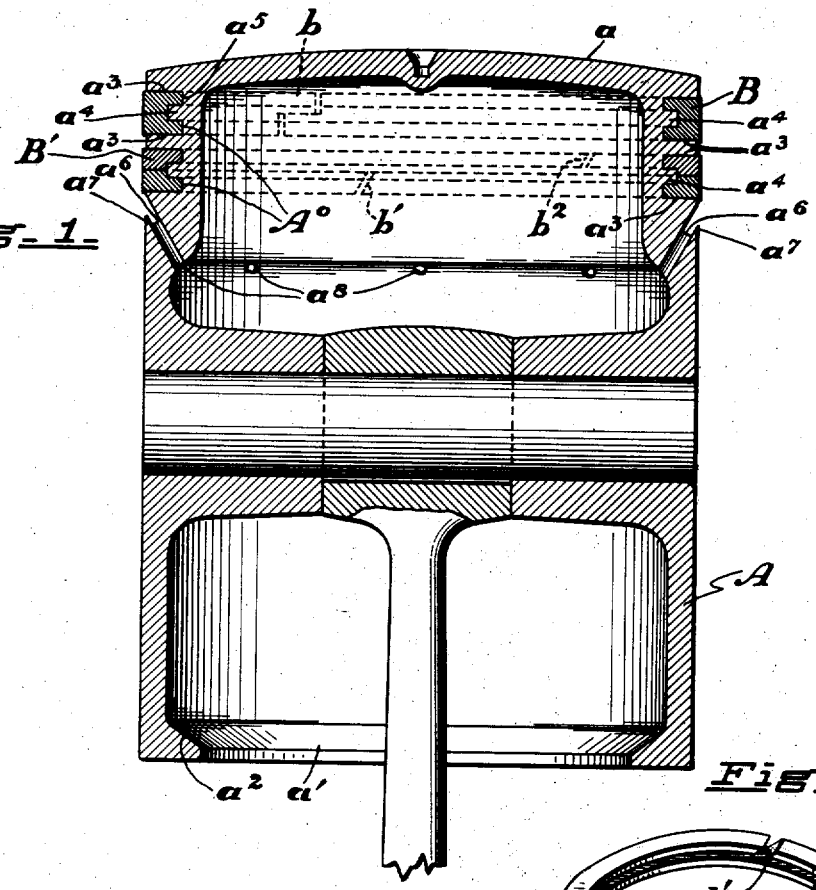
Fig. 1.
Fig. 3.
Fig. 5.
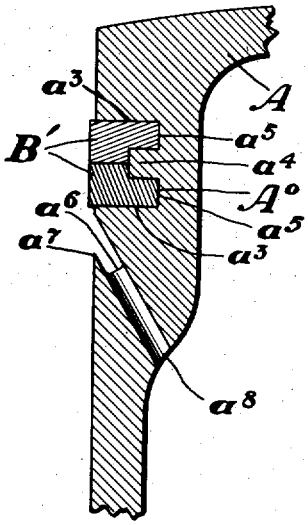
Fig. 4.
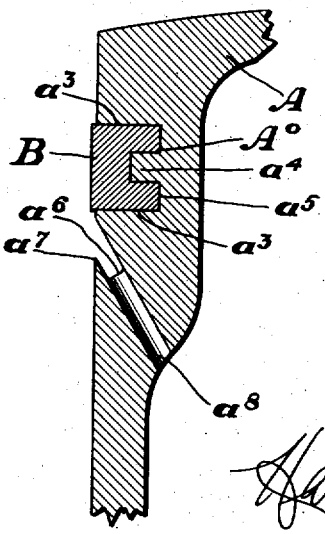
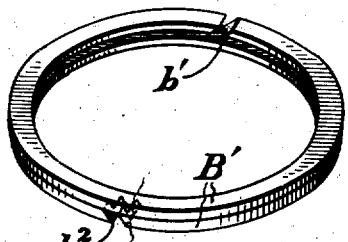
Fig. 2.
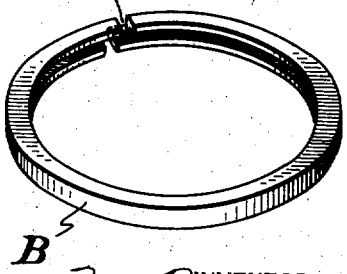
Harry M. Bramberry INVENTOR
BY
Mark W. Hunt ATTORNEY Reissued May 22, 1923. Re. 15,610

UNITED STATES PATENT OFFICE.

HARRY MORTON BRAMBERRY, OF NORFOLK, VIRGINIA, ASSIGNOR TO PISTON RESEARCH CORPORATION, OF NORFOLK, VIRGINIA, A CORPORATION OF VIRGINIA.

METALLIC PISTON PACKING.

Original No. 1,382,465, dated June 21, 1921, Serial No. 358,259, filed February 12, 1920. Application for reissue filed November 24, 1922. Serial No. 603,092.

*To all whom it may concern:*

Be it known that I, HARRY M. BRAMBERRY, a citizen of the United States, residing at Norfolk, in the county of Norfolk and State of Virginia, have invented certain new and useful Improvements in Metallic Piston Packing, of which the following is a specification.

My invention relates to improvements in metallic piston packing for cylinders, and relates more especially to an improved combination of packing rings and grooves provided therefore for use on internal combustion engines.

In such engines as at present constructed, there is a tendency for the lubricating oil to be fed too rapidly along the sides of the cylinder into the combustion chamber, due to the oil passing the packing rings and reaching the combustion end of the cylinder where it is consumed, producing more or less gummy carbon which increases the friction and interferes with the proper operation of the spark plugs, valves, etc.

According to my invention I provide an arrangement for trapping part of the oil before it passes the packing rings. When operating an internal combustion engine at low speed, if the rings are sufficiently tight there is considerable vacuum created in the combustion chamber as the piston is withdrawn on the suction stroke while a pressure somewhat higher than normal is created immediately beneath the descending piston. This tends to suck the oil exterior to or through the breaks in the packing rings and around and inside the sides and back of said rings until part of the oil reaches the combustion chamber where it is consumed on the ignition stroke, with the objectionable results as hereinbefore described.

Due to this action there is, with the engines as now generally constructed, an abnormal or excessive flow of oil past the packing rings when the engine is being driven at low speeds. The passage of an excess of oil is also unavoidable with the construction referred to at high speeds, but in such cases the waste of oil is proportionately less. The portion of the oil, thus sucked past the piston rings, which adheres to the cylinder walls is diluted with the fuel sucked into the cylinder and partly forced back past the rings into the crank case where it dilutes the oil supply. The portion of the oil sucked into the combustion chamber which is sprayed over the boundary surfaces is partly actually burned and discharged with the exhaust gases and partly carbonized on the hottest surfaces, notably the piston head, valves and spark plugs, causing overheating, leaking valves, carbon knock, and misfiring.

My invention is intended in a large degree to remedy this flow of excessive oil past the packing rings and includes a piston ring construction in which tongue-and-groove or radially extending closely interengaging parts are formed on the inner peripheral walls of the ring and the walls of the ring groove. A tortuous passage is thus defined between opposed surfaces of ring and groove, into which oil or other fluid can find its way only in the form of a film. Movement of the fluid between piston and ring must therefore be very slow, and the film is substantially maintained in the interposed trapped relation, with resulting benefits as hereinafter explained.

My invention will be more fully understood by reference to the accompanying drawings, in which like parts are indicated by similar reference symbols throughout the several views, and in which:

Figure 1 shows a central vertical section through the piston of an ordinary internal combustion engine fitted with my improved packing arrangement, the piston pin and connecting rod being shown in elevation. While I have not shown the cylinder, it is understood that it is a usual internal combustion engine cylinder with external cooling means.

Figure 2 shows a single ring adapted to be used with a groove of the character shown in Figure 1.

Figure 3 shows a double ring adapted to be used with a groove of the character shown in Figure 1.

Figure 4 shows a modification in which a single ring is used in a single groove; and Figure 5 shows a modification in which double ring is shown in a single groove.

A represents a hollow piston of the type commonly used on internal combustion engines, provided with a closed end $a$ and an open end $a'$. Around the open end of the piston there is a tapered lip $a^2$ which serves to direct any oil which falls in the hollow chamber in the piston toward the center of the cylinder and away from the walls thereof, and also serves as a stiffening rib to strengthen the open end of the piston.

The piston is provided with any suitable number of grooves to receive the packing rings. The walls of each ring-groove are uninterrupted, in the sense that there are no openings through them; and while they include a plurality of distinct surfaces, as hereinafter described, these surfaces are continuous with each other, and unbroken. In Figure 1 I have shown two such grooves, in Figures 4 and 5 I have shown only one of said grooves, but the number may be increased to more than two if desired to suit varying conditions.

The various grooves indicated by $A^0$ have parallel plane radial side walls $a^3$, midway between which the annular rib $a^4$, rectangular in cross section, projects from the bottom of the groove. The sides of this annular rib are plane, and parallel with the side walls $a^3$ of the groove $A^0$. Between this rib and the adjacent side walls there are depressed annular channels $a^5$, each of which may conveniently have the width of rib or ridge $a^4$.

The packing ring structure may be either of the single or double type; if of the single type, as shown at B in Figures 1, 2 and 4, it has an annular groove cut on its interior which fits snugly over the annular rib $a^4$. The radial surfaces of the main slot or groove A and of the rib, and the corresponding radial surfaces of the packing ring, form, by virtue of this snug fit, substantially unchanging capillary oil retaining spaces, with communicating annular spaces defined between the other opposed surfaces of ring and piston, and whose dimensions are determined by the bore of the cylinder and the amount the packing ring is expanded at any moment. This ring is split in any convenient way, as by the lap-joint cut $b$ shown in Figures 1 and 2 to permit its free radial expansion and contraction as the piston reciprocates in the usual manner. With the double ring B′ shown in Figures 3 and 5, each part of the double ring may be formed in the shape of an L, with two plane surfaces abutting in a plane perpendicular to the piston axis, to form an annular groove that engages over the annular rib $a^4$. In case the rings are made in two sections the joint will, of course, be broken, as indicated at $b'$ and $b^2$ in Figures 1 and 3.

On the piston, adjacent to and below the lower ring, I provide an oil groove of the special design shown in Figures 1, 4 and 5, in which there is a cup-shaped annular groove $a^6$, the edge $a^7$ of which serves to plane off the oil from the interior of the cylinder and to direct it into the groove $a^6$. This planing action of the lip $a^7$ is also assisted by the scraping action of the lower edge of the packing ring, which tends to scrape the oil off the interior of the cylinder and direct it to the annular groove $a^6$ already referred to.

In order to carry off the oil which tends to accumulate in this groove $a^6$, I provide a series of ducts $a^8$ of suitable size, which are inclined inward as shown, and these ducts permit the oil to drain through into the interior of the hollow piston and also direct it toward the axis thereof. If any oil trickles down the inner wall of the piston it will ultimately reach the inclined rib $a^2$ and will be deflected in toward the axis of the piston, away from the walls of the cylinder.

Any oil that is sucked by the vacuum toward the combustion end of the cylinder is obliged either to flow outside of the packing rings, or between the packing rings and the piston. Such part of the oil as passes outside the packing rings is ordinarily very efficient in lubricating the packing rings, while any excess oil forced inside the rings will have to flow through the constricted passages between the adjacent faces of the grooves, and the annular rib and the adjacent faces of the ring or rings, so that this oil, in order to pass inside the packing rings, will be obliged to follow a very tortuous channel. Since this tortuous channel always includes a plurality of capillary spaces or seals for each ring, with included communicating oil-trapping annular spaces, and since the capillary spaces or seals will permit only a very slow flow, if any, it follows that even at slow speeds little, if any, oil can flow in either direction past the ring.

I have found in practice that any leakage past the interior of the rings is greatly decreased by having as low clearance as practicable between the ring and the adjacent walls of the groove. By making these clearances as small as practicable I have found that there is very little leakage of oil with the construction designed by me and shown in the drawings.

It will be apparent from the drawings that the contact between the several plane radial surfaces of the piston and the piston ring structure is so close that oil or other fluid can find its way between piston and ring (so far as the said contacting surfaces thereof are concerned) only in the form of a film. Movement of the fluid between piston and ring must therefore be very slow, and the fluid is maintained in the interposed trapped relation, with such incidental beneficial effects as (1) prevention of rapid movements of the ring in the groove longitudinally of the piston; (2) provision of a hydraulic check to any quick movements of the ring crosswise of the piston; (3) minimizing of deleterious effects from excessive gap at the split ends of the ring; and (4) superior heat conduction. The close fitting tongue-and-groove arrangement therefore, is actually saving of both piston and ring, and by bringing the parts into what would at first sight seem to be a harmful frictional relation, friction is actually eliminated.

It will be obvious also that, by having the tight joint referred to, a better compression is secured on the compression stroke, and less waste of oil, and better results on the expansion stroke, there being very little leakage of air or gas in either case by the packing ring, because of the presence of the filmed entrapped oil.

In low speed motors, especially of larger size, a single ring, as shown in Figure 4, has been found highly efficient; whereas where the motors are small, especially if the piston speed is high, the double ring shown in Figure 5 is preferred, and in such cases the piston is generally more loosely fitted in the cylinder than with the slow speed engines, and the ring in two parts has been found preferable.

In order to get the best results, it is desirable that the cutting of the groove for the packing ring and also the groove for oil be done very accurately, and for this purpose it is generally preferable to use a special form of cutting implement to secure the accuracy desired. This accuracy gives true bearing surfaces, and since my grooved packing ring slot construction prevents any rocking of the ring—as occurs with ordinary rings—the capillary surfaces are preserved and a sealing, oil trapping space is formed, which effectually prevents any substantial flow of gas, oil, or fuel behind the ring.

It will be obvious that various modifications might be made in the herein described apparatus, and in the construction, combination and arrangement of parts which could be used without departing from the spirit of my invention; and I do not mean to limit the invention to such details except as particularly pointed out in the claims.

I claim:

1. In combination with the cylinder of an internal combustion or other compression engine, a piston having an annular ring-groove in the cylindrical surface thereof with parallel plane side walls perpendicular to the axis of the piston, the ring-groove having a generally rectangular rib or ridge projecting outwardly from the bottom of the groove, with side walls parallel to but of less height than the side walls of the groove and defining, with the side walls of the groove, two channels, one on each side of the rib, the walls that define the groove, the rib, and the channels being continuous with each other and unbroken; and a split spring packing-ring structure fitted in the groove and provided with a cylinder-engaging surface and expanding as a whole to keep the cylinder-engaging surface in contact with the cylinder wall, the ring-structure having substantially the same cross-sectional configuration and dimensions as the ring-groove, whereby an oil-sealing packing is provided and leakage of fluid between ring-structure and piston is minimized in the operation of the piston.

2. In combination with the cylinder of an internal combustion or other compression engine, a piston having an annular ring-groove in the cylindrical surface thereof with parallel plane side walls perpendicular to the axis of the piston, the ring-groove having a generally rectangular rib or ridge projecting outwardly from the bottom of the groove, with side walls parallel to but of less height than the side walls of the groove and defining, with the side walls of the groove, two channels, one on each side of the rib, the walls that define the groove, the rib, and the channels being continuous with each other and unbroken; and a split spring packing-ring structure fitted in the groove and provided with a cylinder-engaging surface and expanding as a whole to keep the cylinder-engaging surface in contact with the cylinder wall, the ring-structure having substantially the same cross-sectional configuration and dimensions as the ring-groove, whereby an oil-sealing packing is provided and leakage of fluid between ring-structure and piston is minimized in the operation of the piston, the total area of the ring-structure surfaces that are in contact with the piston being greater than the cylinder-engaging surface of the ring-structure.

3. The structure set forth in claim 1, in which the ridge or rib has approximately the same width as each of the adjacent channels.

4. The structure set forth in claim 1, in which the piston-ring structure comprises separate parts that have surface contact with each other in a plane perpendicular to the axis of the piston.

5. The structure set forth in claim 1, in which the piston-ring structure comprises two halves, each a split ring substantially L-shaped in cross-section.

6. In combination with the cylinder of an internal combustion engine, a piston having an annular ring-groove in the peripheral surface thereof, a split spring piston ring structure having cross-sectionally a U-shaped formation with the arms thereof extending radially inward, and said ring-groove having an uninterrupted surface configuration formed in complementary relation to the arms and intermediate channel of the U-shaped ring, whereby the ring-groove is substantially filled by the ring and a tortuous leak-proof joint provided between the ring and its seat.

In testimony whereof I affix my signature.

HARRY MORTON BRAMBERRY.